(12) United States Patent
Gates

(10) Patent No.: US 6,523,646 B1
(45) Date of Patent: Feb. 25, 2003

(54) SPRING DRIVEN APPARATUS

(76) Inventor: Glenn A. Gates, 1436 Auauki St., Kailua, HI (US) 96734

( * ) Notice: Subject to any disclaimer, the term of this patent is extended or adjusted under 35 U.S.C. 154(b) by 0 days.

(21) Appl. No.: 09/364,057

(22) Filed: Jul. 30, 1999

(51) Int. Cl.$^7$ ................................................. F03G 1/00
(52) U.S. Cl. ............................. 185/37; 185/10; 185/38
(58) Field of Search ........................ 185/37, 39, 40 R, 185/41 R, 41 C, 40 A, 38, 9, 10

(56) References Cited

U.S. PATENT DOCUMENTS

| | | | | |
|---|---|---|---|---|
| 3,945,453 A | * | 3/1976 | Black | 180/54 |
| 4,371,058 A | * | 2/1983 | Holley | 185/11 |

* cited by examiner

Primary Examiner—Charles A. Marmor
Assistant Examiner—Tisha D. Waddell

(57) ABSTRACT

A spring driven apparatus includes power shafts mounted upon a base, torsion springs mounted about the power shafts, power gears attached to the power shafts, a drive shaft for transferring energy generated by the torsion springs to a drive flywheel and to a rewind flywheel which is connected to a cam which actuates ratchet members which rotates the power shafts to rewind the torsion springs. The spring driven apparatus can run because of the power generated by the torsion springs, which are partially unwound each time, which generates useful power that can be used to propel golf carts, home generators and similar applications and also generates energy which goes back into the rewinding and resetting of the torsion springs.

9 Claims, 3 Drawing Sheets

SPRING DRIVEN APPARATUS

BACKGROUND OF THE INVENTION

The present invention relates to a spring driven apparatus which can be used to drive golf carts, connect to generators for homes, and other similar applications. The spring driven apparatus operates, using a series of springs to store power.

To create a comparison, consider the operation of a grandfather clock. It must be wound up to make it work. As the pendulum swings from side to side, it unwinds the clock, and eventually the clock slows or stops entirely and must be rewound.

The spring apparatus uses springs, on the same principle as a grandfather clock. The springs must be wound and preset after the initial assembly. The springs will unwind, but never all the way; never more than 30 degrees. A multiple of springs are set horizontally and arranged in a circle. There is a simple double ratchet system at one end of the apparatus connected to the springs. The double ratchet system rewinds the 30 degrees back into the springs. As the springs are unwinding, the force from all the springs will reset one spring at a time, in one revolution. The reset is what forces energy out the opposite end of the spring. This is where the flywheel is located. The amount of horsepower generated by the apparatus is determined by the amount of torque wound into the spring at assembly. A spring is the most efficient means of storing energy that is to be converted into usable horsepower.

Energy is stored in the springs and power is generated by way of the various forces which cause the springs to wind and unwind.

One known prior art, is an ELASTIC ENERGY STORING DEVICE, U.S. Pat. No. 4,762,202, issued on Aug. 9, 1988 and invented by Masahiro Ogawa, which comprises a first drum, a second drum, at least one intermediate drum, an elastic cord wound from the first drum to the second drum, and means for mechanically connecting the drums.

Another known prior art is SPRING MECHANISMS, U.S. Pat. No. 4,591,136, issued on May 27, 1986 and invented by George H. Leonard, which is useful as a counterbalance or as a spring suspension.

Another known prior art is a SPRING-OPERATED REVERSABLY ROTATABLE BODY, U.S. Pat. No. 4,290,564, issued on Sep. 22, 1981 and invented by Hans I. R. Karlsson.

Another known prior art is a SPRING DRIVE MECHANISM, PARTICULARLY FOR MOBILE TOYS, U. S. Pat. No. 4,053,029, issued on Oct. 11, 1977 and invented by Helmut Darda, which comprises an axle which is a portion of a spring wire which is retained in spring drive mechanism plates.

None of the prior art discloses a spring driven apparatus which, in essence, feeds upon itself to continue to operate and store useable power as is the case with the present invention.

SUMMARY OF THE INVENTION

This invention relates to a spring driven apparatus which comprises a base having a pair of shaft support members extending upward therefrom, a plurality of power shafts each of which are split and having ends journaled through the shaft support members and each power shaft having a sprocket mounted about near one end thereof with a separate rewind lock engaging each sprocket, a plurality of torsion springs each mounted about a respective one of the power shafts, a drive shaft also journaled through the shaft support members and having a rewind flywheel and a drive flywheel, one mounted at each end thereof, the rewind flywheel being connected to a cam which actuates a plurality of ratchet members which rewind the torsion springs to re-energize the torsion springs, and a power transfer means including a plurality of power gears connected to the power shafts and drive shaft and carrying chains to power the drive shaft and the flywheels. The torsion springs are initially energized by a user rotating the power shafts which wind the torsion springs to a desired tension with the ratchet members. Upon release, the torsion springs release some of their energy, but not all, to the power shafts which transfer energy and power to the power transfer means which transfer power and energy to the drive shaft which, in turn, not only drives the drive flywheel but also returns energy back to the rewind flywheel which actuates the cam which, in turn, actuates the ratchet members and rewinds the torsion springs, individually, and in spaced intervals and between pauses to restore energy to the torsion springs. The amount of energy restored to the torsion springs is energy released by the torsion springs, which allows this spring driven apparatus to operate.

One objective of the present invention is to provide a spring driven apparatus which can reset itself by a wind and unwind method.

Another, objective of the present invention is to provide a spring driven apparatus which does not emit any harmful fumes or exhausts into the environment unlike that of fuel burning machines.

Also, another objective of the present invention is to provide a spring driven apparatus which generates horsepower capable of driving golf carts and generators and other devices and apparatuses.

Further objectives and advantages of the present invention will become apparent as the description proceeds and when taken in conjunction with the accompanying drawings wherein:

DETAILED DESCRIPTION OF THE INVENTION

Figure 1:
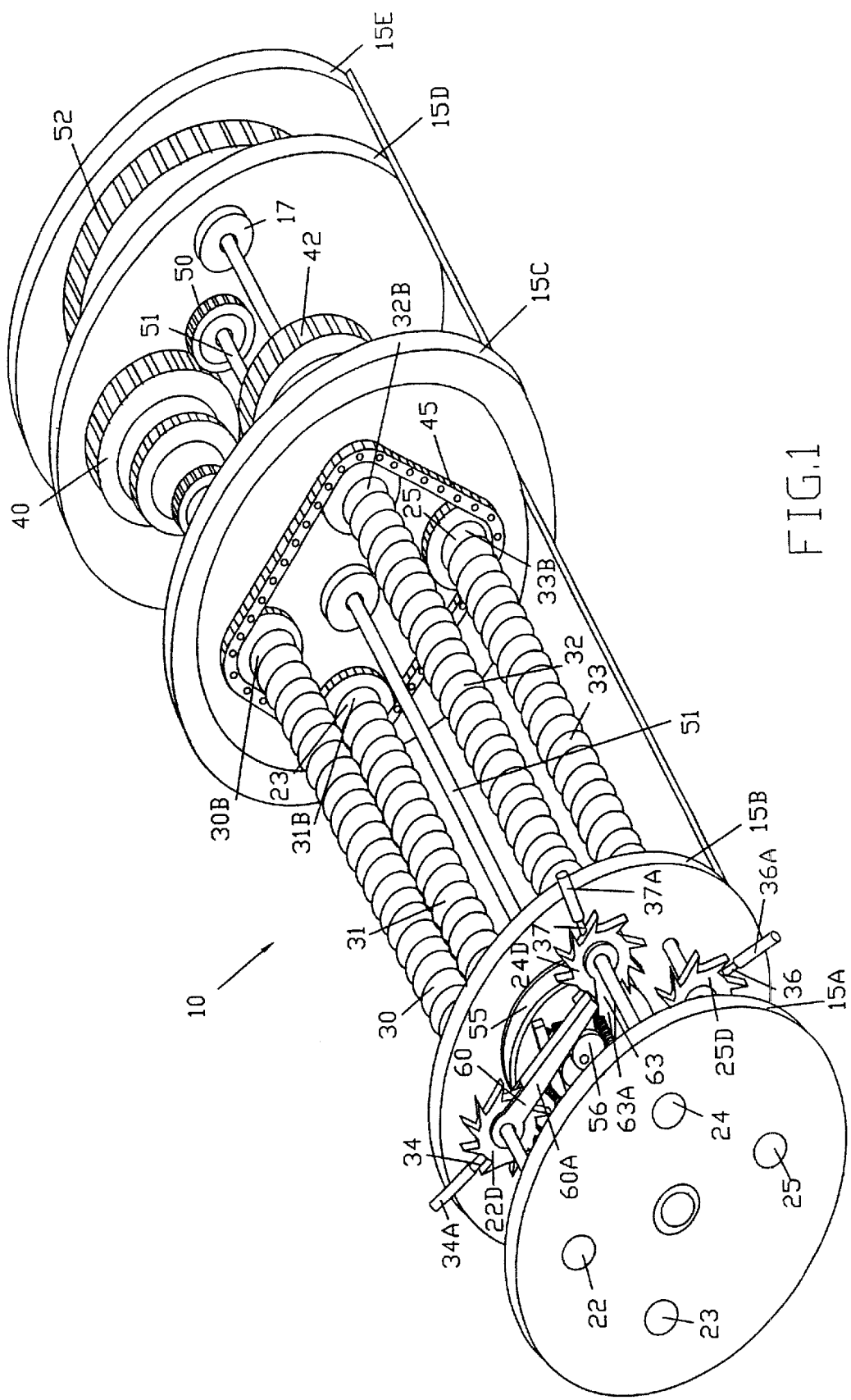
FIG. 1 is a perspective view of the spring driven apparatus.
Figure 2:
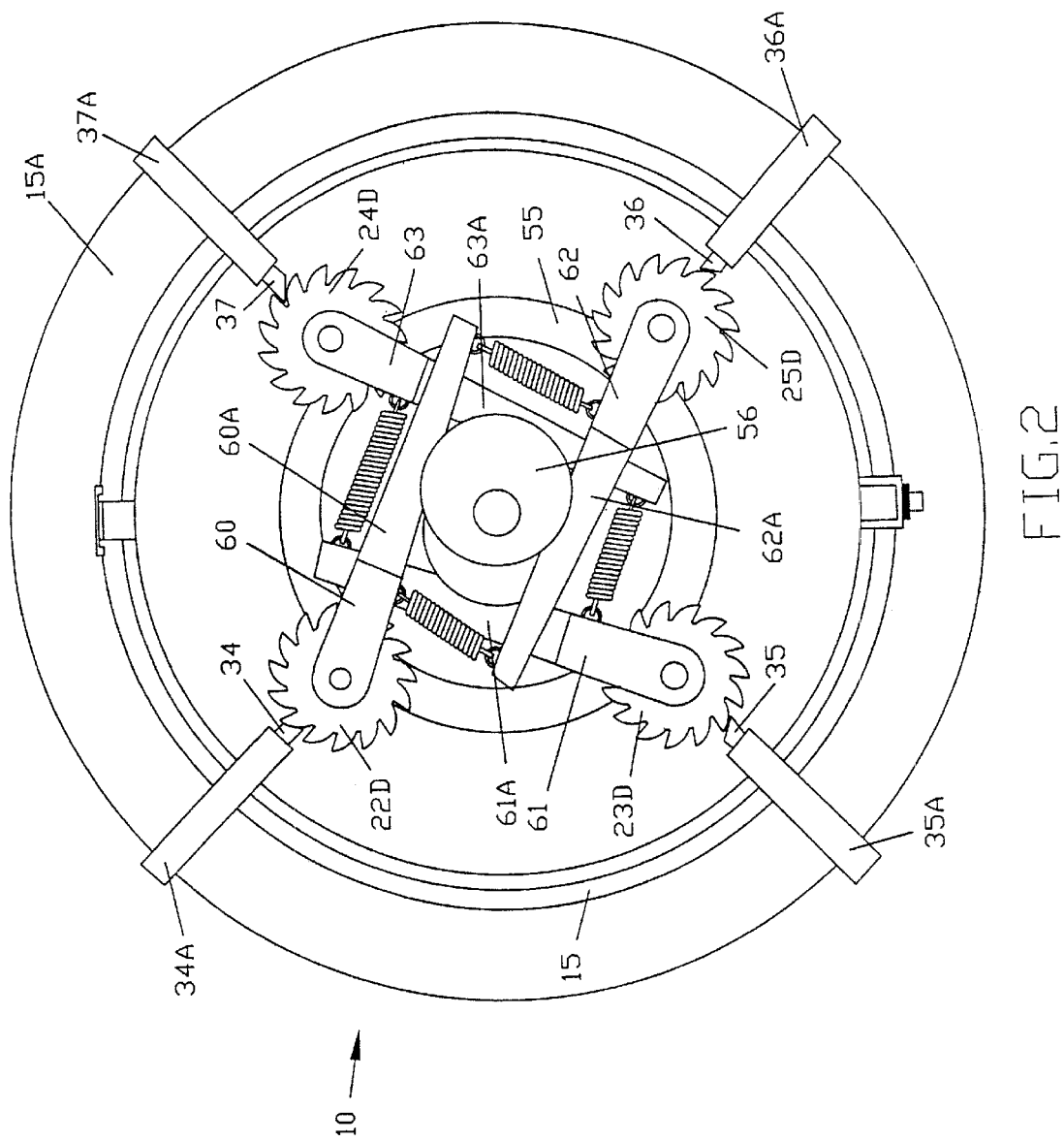
FIG. 2 is a detailed side view of the rewind means including the ratchet means and the cam of the spring driven apparatus.
Figure 3:
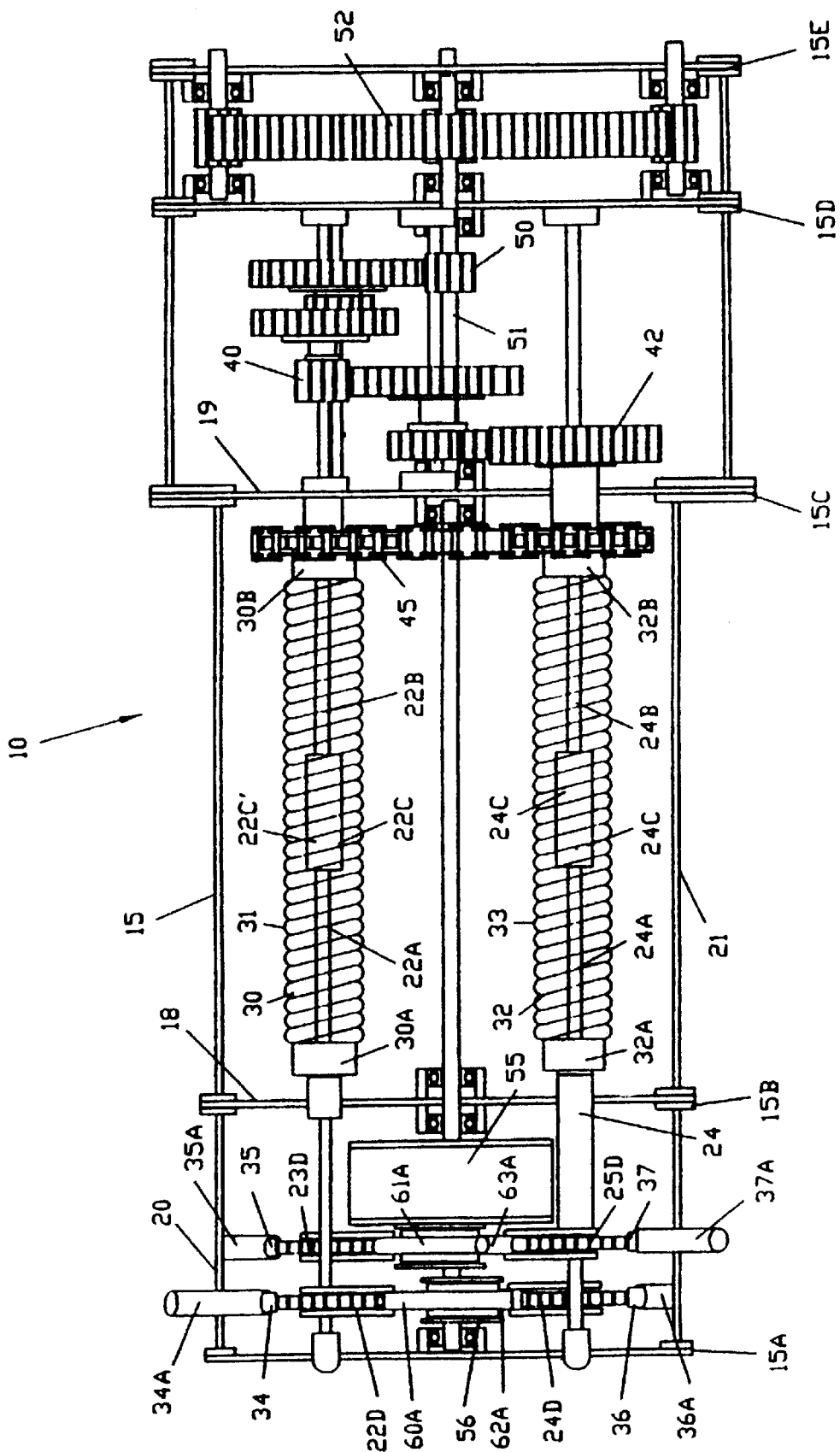
FIG. 3 is a top plan view of the spring driven apparatus.

Referring to the drawings in FIGS. 1–3, the spring driven apparatus 10 comprises a base 15 having shaft support members 15A–E extending upward from near the ends of the base 15, the shaft support members 15A–E being essentially elongated brackets having ends welded to cross members 18, 19 which are welded to longitudinal members 20, 21 forming the bottom of the base 15. The spring driven apparatus 10 further comprises a plurality of power shafts 22–25 each being split near the middle of the respective shaft with one split portion 22a, 24a of the power shafts 22–25 being journaled to one of the shaft support members 15b and the other split portion 22b, 25b being journaled to an opposed shaft support member 15c, the split portions of each power shaft being coupled together with a coupler member 22c, 24c and all the power shafts 22–25 being disposed parallel to one another. Each of the coupler member 22c, 24c comprises a sleeve 22c', 24c' and at least one bearing and bushing engaging the respective power shaft 22–25.

Each power shaft 22–25 supports a separate torsion spring 30–33 with each torsion spring 30–33 having one end securely engaged to a first spring stop 30a, 32a which is fixedly attached with fasteners to one split portion 22a, 24a of the respective power shaft 22–25 and further having an opposite end securely engaged to a second stop member 30b–33b which is fixedly attached with fasteners to the other split portion 22b, 24b of the respective power shaft 22–25. Each power shaft 22–25 further has a separate sprocket 22d–25d which is fixedly attached to one of the split portions 22a, 24a of the respective power shaft 22–25 and which has teeth which are engageable to a rewind lock 34–37 which is mounted in cooperation with the respective sprocket 22d–25d and which is mounted to a bracket 34a–37a fixedly attached to the base 15 and which prevents the respective torsion spring 30–33 which is reset or rewound from unwinding by engaging the teeth of the sprocket 22d–25d and preventing the sprocket 22d–25d from rotating in the direction of the force effected upon it by the torsion spring 30–33 which is being wound up.

When the torsion springs 30–33 are released, only so much of each torsion spring 30–33 is expended at any one time. Energy from the torsion springs 30–33 are transferred to their respective power shafts 22–25, in particular, to the split portions 22b, 24b of the respective power shafts opposite the split portions 22a, 24a with the sprockets 22d–25d. The energy from the torsion springs 30–33 effects rotation of the power shafts 22–25 and is transferred to a power transfer means which comprises a plurality of power gears 40, 42 equal to the number of power shafts 22–25 with one power gear to a power shaft. The power gears 40, 42 are mounted to the ends of the split portions 22b, 24b of the power shafts 22–25 without the sprockets 22d–25d and carry a member 45 such as a belt or chain which interconnects the power gears 40, 42 to a drive gear 50 mounted upon near the end of a drive shaft 51 which is journaled through the shaft support members 15b, 15c and which further has a drive flywheel 52 attached to one end thereof, the drive flywheel 52, being disposed generally parallel to the power shafts 22–25. The drive shaft 51 is actuated by the power gears 40, 42 of the power shafts and transfers energy not only to the drive flywheel 52 which supplies power to a rewind means which reset the torsion springs 30–33 and which comprises a rewind flywheel 55 mounted to the end of the drive shaft 51 opposite to the drive flywheel 52, a cam 56 attached to the rewind flywheel 55, and a plurality of ratchet members 60–63 equal to the number of power shafts 22–25 with one ratchet member to a power shaft, the ratchet members 60–63 being attached to the ends the power shafts 22–25 opposite to the power gears 40, 42. Each of the ratchet members 60–63 has a lever 60a–63a which is contactable with the cam 56 on the rewind flywheel 55.

As the rewind flywheel 55 is rotated, the cam 56 has an eccentric portion which rotates therewith and moves the levers 60a–63a on the ratchet members 60–63 which turns the power shafts 22–25 to rewind and reset the torsion springs 30–33. The cam 56, in essence, cranks the ratchet members 60–63 as the cam 56 rotates eccentrically with the rewind flywheel 55. One of the ratchet members 60–63 at any one time is being cranked and moved by the cam 56, which in turn, cranks the respective power shaft 22–25 which rewinds the respective torsion spring 30–33. All the power shafts 22–25 have longitudinal axes which are generally equally spaced about the axis of the cam 56 such that during each revolution of the cam 56, the ratchet members 60–63 are actuated by the cam 56 and rotate the power shafts 22–25 and the torsion springs 30–33 from about 10 to 15 degrees each time.

Initially, all the torsion springs 30–33 are wound preferably from 3 to 6 turns about their respective power shafts 22–25 and are locked by the rewind locks 34–37 so that they do not uncontrollably unwind. When the torsion springs 30–33 are allowed to partially unwind and as the torsion springs 30–33 partially unwind, energy is transferred to the split portions 22b, 24b of the power shafts 22–25 connected to the power gears 40–43 which actuate the drive gear 50 which actuates the drive shaft 51 and drive flywheel 52 and the rewind flywheel 55 which turns the cam 56. Each torsion spring 30–33 generates approximately 200 foot pounds of torque.

During the unwinding and rewinding of the torsion springs 30–33, an equilibrium is reached where the energy being released by some of the torsion springs 30–33 is close to the energy being restored back into the other torsion springs 30–33. In order to avoid a total lock up of the torsion spring driven apparatus, the rewind flywheel 55 incidentally and timely pauses in its revolution to overcome this equilibrium so that the energy being released by some of the torsion springs 30–33 overcomes the energy being restored in the other torsion springs 30–33. During each revolution of the rewind flywheel 55, each torsion spring 30–33 is rewound and receives restored energy by the torsion spring 30–33. This spring driven apparatus 10 can operate with each torsion spring 30–33 being reset during each revolution of the rewind flywheel 55 which not only drives the cam 56 which cranks the ratchet members 60–63 which resets the torsion springs 30–33 but which also effects the momentum upon the drive shaft 51 to deep the drive shaft 51 rotating even during the incidental and timely pauses.

Various changes and departures may be made to the invention without departing from the spirit and scope thereof Accordingly, it is not intended that the invention be limited to that specifically described in the specification or as illustrated in the drawings but only as set forth in the claims.

What is claimed is:

1. A spring driven apparatus comprising:
    a base having shaft supporting members extending upward therefrom;
    a plurality of power shafts each of which is split near a center thereof and has one split portion journaled through one of said shaft support members and another split portion journaled through another one of said shaft support members, said split portions of each of said power shafts being coupled together such that said split portions are independently rotatable of each other;
    a plurality of torsion springs each being mounted about a respective one of said power shafts; a power transfer means having a plurality of power gears each of which is mounted to a respective one of said power shafts, a drive shaft being journaled to said shaft supporting members, a drive gear mounted to said drive shaft, a drive flywheel mounted to said drive shaft, and members carried by said drive gear and said power gears; and a unwind and rewind means.

2. A spring driven apparatus as described in claim 1, wherein each of said torsion springs is capable of generating about 200 foot pounds of torque.

3. A spring driven apparatus as described in claim 1 further comprises a plurality of spring stops engaged at the ends of said torsion springs and fastenably mounted to said power shafts.

4. A spring driven apparatus as described in claim 3, wherein each of said spring stops is mounted to a respective one of said split portions of said power shafts.

5. A spring driven apparatus as described in claim 4, wherein each of said rewind means further includes a plurality of sprockets each of which is mounted to a respective one of said power shafts and a plurality of rewind locks mounted to said base, each of said rewind locks being in alignment with and engageable to the teeth of a respective one of said torsion springs to prevent uncontrolled unwinding of said torsion springs.

6. A spring driven apparatus as described in claim 5, wherein said rewind means further comprises a rewind flywheel mounted to said drive shaft for rotation therewith, a cam mounted to said rewind flywheel, and a plurality of ratchet members each of which are attached to a respective one of said power shafts for turning said power shafts thus effecting the rewinding of said torsion springs.

7. A spring driven apparatus as described in claim 6, wherein said power shafts have longitudinal axes which are generally equally spaced from the axis of said cam.

8. A spring driven apparatus as described in claim 7, wherein each of said ratchet members has a lever which is in movable and contactable relationship to said cam.

9. A spring driven apparatus as described in claim 8, wherein said cam has an eccentric portion which essentially rotates about the axis of said cam and moves each of said levers on said ratchet members such that each of said ratchet members rotates its respective power shaft and spring from about 10 to 15 degrees.

\* \* \* \* \*